United States Patent [19]
Triece et al.

[11] Patent Number: 5,987,583
[45] Date of Patent: Nov. 16, 1999

[54] PROCESSOR ARCHITECTURE SCHEME AND INSTRUCTION SET FOR MAXIMIZING AVAILABLE OPCODES AND ADDRESS SELECTION MODES

[75] Inventors: Joseph W. Triece, Phoenix; Sumit K. Mitra, Tempe, both of Ariz.

[73] Assignee: Microchip Technology Inc., Chandler, Ariz.

[21] Appl. No.: 08/959,942

[22] Filed: Oct. 29, 1997

Related U.S. Application Data

[63] Continuation-in-part of application No. 08/946,426, Oct. 7, 1997.

[51] Int. Cl.⁶ .................................................. G06F 9/34
[52] U.S. Cl. ........................... 711/214; 711/219; 712/220
[58] Field of Search ................................ 711/214, 220, 711/219; 395/376; 712/220

[56] References Cited

U.S. PATENT DOCUMENTS

| | | | |
|---|---|---|---|
| 3,946,366 | 3/1976 | Edwards, Jr. .......................... | 711/211 |
| 4,047,245 | 9/1977 | Knipper .................................. | 711/213 |
| 4,240,142 | 12/1980 | Blahut et al. ...................... | 395/800.42 |
| 5,367,648 | 11/1994 | Chuang et al. ......................... | 395/566 |
| 5,832,533 | 11/1998 | Agarwal et al. ........................... | 711/2 |

*Primary Examiner*—Kenneth S. Kim
*Attorney, Agent, or Firm*—Ronald L. Chichester; Paul N. Katz; Frohwitter

[57] ABSTRACT

A system for allowing multiple addressing modes while maximizing a number of available opcodes and addressable registers. The system has a processor architecture scheme which allows for encoding of multiple addressing modes through use of virtual register addresses. The system has an instruction set having a plurality of instructions. Each instruction has a plurality of bits wherein none of the plurality of bits in each of the plurality of instructions are dedicated bits for implementing different addressing modes. Each of the plurality of instructions are able to implement different addressing modes by addressing the virtual register addresses in the processor architecture scheme. Since no bits are required for implementing different addressing modes, the length of the opcode field and the register address field are determined by the number of opcodes and the number of addressable registers the user wishes to implement.

10 Claims, 2 Drawing Sheets

PROCESSOR ARCHITECTURE SCHEME AND INSTRUCTION SET FOR MAXIMIZING AVAILABLE OPCODES AND ADDRESS SELECTION MODES

RELATED APPLICATION

This patent application is a Continuation-In-Part of co-pending patent application entitled "PROCESSOR ARCHITECTURE SCHEME FOR IMPLEMENTING VARIOUS ADDRESSING MODES AND METHOD THEREFOR," Ser. No. 08/946,426, filed Oct. 7, 1997, in the name of the same inventors, and is incorporated herein by reference.

BACKGROUND OF THE INVENTION

1. Field of the Invention

This invention relates generally to processors and, more specifically, to a processor architecture scheme and instruction set which will allow for maximizing the number of available opcodes and for the encoding of multiple addressing modes through virtual register addresses to maximize the number of directly addressable registers in the processor architecture scheme.

2. Description of the Prior Art

Generally speaking, a processor is an entity where a central processing unit (CPU) is present and is used to fetch and execute stored instructions or micro-code. Some examples of processors are microcontrollers, microprocessors, and digital signal processors. Each type of processor operates on data which is also commonly referred to as operands. This data is generally stored in registers or memory space.

An instruction directs the CPU of a processor to execute a certain operation as well as to identify one or more operand(s) for the operation. Processors offer various means for addressing the data for an operation. These means are commonly referred to as addressing modes. The addressing modes are typically used for arithmetic and logical operations and data move operations and may apply to a source operand, a destination operand, or both.

The problem with current processor architecture schemes is that adding or changing addressing modes is extremely difficult. Without major changes to the instruction set organization, such changes and additions to the addressing modes are not possible. However, changes to the instruction set structure is not desirable since many tools such as assemblers and compilers will also require dramatic changes.

One way to implement different addressing modes is to dedicate bits in the opcode field or the register address field. By setting the dedicated bits, different addressing modes can be implemented. The problem with these architecture schemes is that the number of available opcodes or the number of directly addressable "registers" diminishies significantly. For example, if 8-bits of an instruction are used to encode the "op-code", if two bits of the "op-code" are used to determine the addressing mode, the total number of available instructions decreases from 256 to 64. On the other hand, if 8-bits are available in an instruction word to specify a register operand, it would be possible to address 256 registers directly. However, in order to incorporate other addressing modes, if one of the 8-bits is taken away for this purpose, only 128 registers can now be directly addressed.

In existing processor architecture schemes, where alternate addressing modes are available, encoding is implemented through "control registers" in order to maximize the number of directly addressable registers. However, this creates yet another problem since "selection" of indirect addressing modes is static (until reconfigured) and not dynamic from instruction to instruction.

Therefore, a need existed to provide an improved microcontroller architecture scheme. The improved microcontroller architecture scheme must allow the user to add and change addressing modes. The improved microcontroller architecture scheme must further allow the user to change addressing modes dynamically on an instruction by instruction basis. The improved microcontroller architecture scheme must allow the user to add and change addressing modes while maximizing the number of available opcodes for a given number of instruction bits. The improved microcontroller architecture scheme must further allow the user to add and change addressing modes while maximizing the number of directly addressable registers.

SUMMARY OF THE INVENTION

In accordance with one embodiment of the present invention, it is an object of the present invention to provide an improved microcontroller architecture scheme.

It is another object of the present invention to provide an improved microcontroller architecture scheme that allows the user to add and change addressing modes.

It is yet another object of the present invention to provide an improved microcontroller architecture scheme that allows the user to add and change addressing modes while maximizing the number of directly addressable registers.

It is still another object of the present invention to provide the aforementioned improvements to the microcontroller architecture scheme while maintaining the ability to choose addressing modes dynamically on an instruction by instruction basis.

It is still a further object of the present invention to provide an improved microcontroller architecture scheme which allows the user to add and change addressing modes while maximizing the number of available opcodes for a given number of instruction bits.

BRIEF DESCRIPTION OF THE PREFERRED EMBODIMENTS

In accordance with one embodiment of the present invention, a system for allowing multiple addressing modes while maximizing a number of available opcodes and addressable registers is disclosed. The system has a processor architecture scheme which allows for encoding of multiple addressing modes through use of virtual register addresses. The system has an instruction set having a plurality of instructions. Each instruction has a plurality of bits wherein none of the plurality of bits in each of the plurality of instructions are dedicated bits for implementing different addressing modes. Each of the plurality of instructions are able to implement different addressing modes by addressing the virtual register addresses in the processor architecture scheme.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
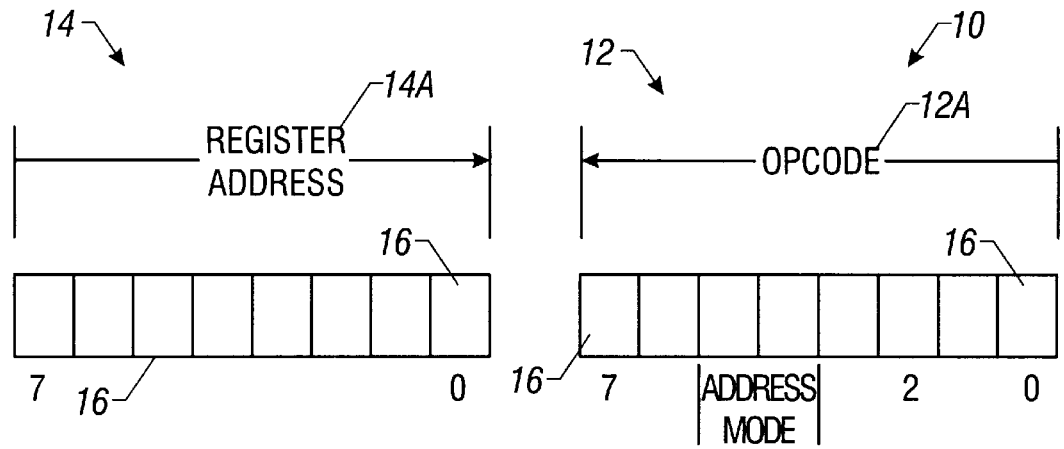
FIG. 1 is a simplified block diagram depicting a typical encoding of a prior art instruction.

Referring to FIG. 1, a typical prior art instruction 10 to be executed by a processor is shown. The instruction 10 is comprised of a first byte 12 and a second byte 14. Each byte 12 and 14 is comprised of a plurality of bits 16. The first byte 12 is used to establish an opcode field 12A. The opcode field 12 specifies the particular operation to be carried out by the instruction (i.e., "addition", "shift", "branch", etc.). The second byte 14 is a register or data address field 14A. The register or data address field 14A points out the operand (i.e., data) on which the operation is to be carried out. It is possible to have more than one register or data address field 14A. For example, there may be a source address field and a destination address field.

In the prior art shown in FIG. 1, each byte 12 and 14 is 8-bits wide. In the opcode field 12A, two bits (bits 4 and 5) are reserved for determining the addressing mode. For example, if bits <5:4>=01, this might imply a direct addressing mode. This would mean that bits <7:0> in the second byte 14 would be an 8-bit register address 14A. If bits <5:4>=10, this might imply an indirect addressing mode. In this example, bits <7:0> of the second byte 14 might encode the offset to the data pointer register.

The encoding scheme of the instruction 10 has several problems. Although 8-bits of the instruction are used to encode the opcode 12A, two bits (bits 4 and 5) are used to determine the addressing mode. This decreases the total number of available opcode instructions from 256 to 64. Further more, since only two bits are encoded in the first instruction byte 12 to determine addressing modes, only four addressing modes are possible.

Figure 2:
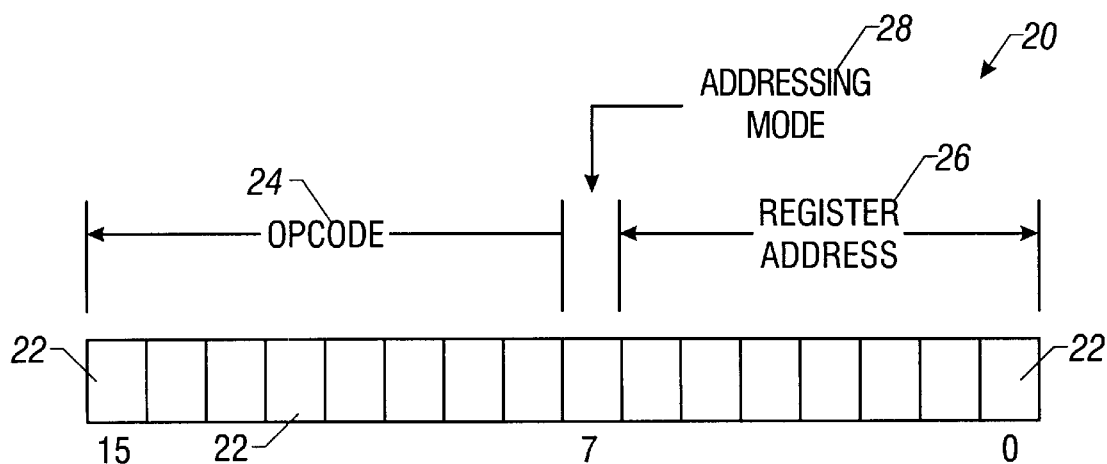
FIG. 2 is a simplified block diagram depicting a second embodiment of a typical encoding of a prior art instruction.

Referring to FIG. 2, another prior art instruction 20 to be executed by a processor is shown. Like instruction 10 (FIG. 1), the instruction 20 is comprised of a plurality of bits 22. The bits 22 are generally divided into three main fields: (1) an opcode field 24, (2) a register or data address field 26, and (3) addressing mode field 28. Like the instruction 10 in FIG. 1, the opcode field 24 is a collection of bits 22 that specify the particular operation to be carried out by the processor. In general, there are three main types of operations: (1) arithmetic and logic operations (i.e., add, subtract, etc.); (2) data move operations; and (3) program control (e.g., branch operations). The register or data address field 26 points out the operand (i.e., data) on which the operation is to be carried out. It is possible to have more than one register or data address field 26. For example, there may be a source address field and a destination address field.

The instruction 20 shown in FIG. 2 is a 16 bit wide instruction. The 7th bit in the instruction 20 is used to select an addressing mode. If the 7th bit is a zero (0), direct addressing is implied. Thus, bits <6:0> form a 7-bit register address which allows for 128 registers. If the 7th bit is a one (1), then an indirect address is implied. In this situation, bits <6:0> encode the data pointer address as well as pointer increment/decrement options.

In the prior art, 8-bits of the instruction are used to encode the "op-code". Therefore, 8-bits are left to address register locations. Using these 8 bits, up to 256 registers could be accommodated in the architecture. However, since the 7th bit is used as an addressing mode bit to differentiate between indirect addressing or direct addressing, only 128 registers are accommodated. Thus, the number of addressable registers is reduced by half by implementing an addressing mode bit. Furthermore, adding or changing addressing modes is extremely difficult. Without major changes to the instruction set organization, the changes or additions to the addressing modes are not possible. Any change to the instruction set structure is not desirable since many tools such as assemblers or compilers will also require dramatic changes.

As can be seen from the above description, the prior art requires one or more bits in the instruction to indicate the particular addressing mode to implement. Thus, this dramatically reduces the number of available opcode instructions and the number of addressable registers.

Figure 3:
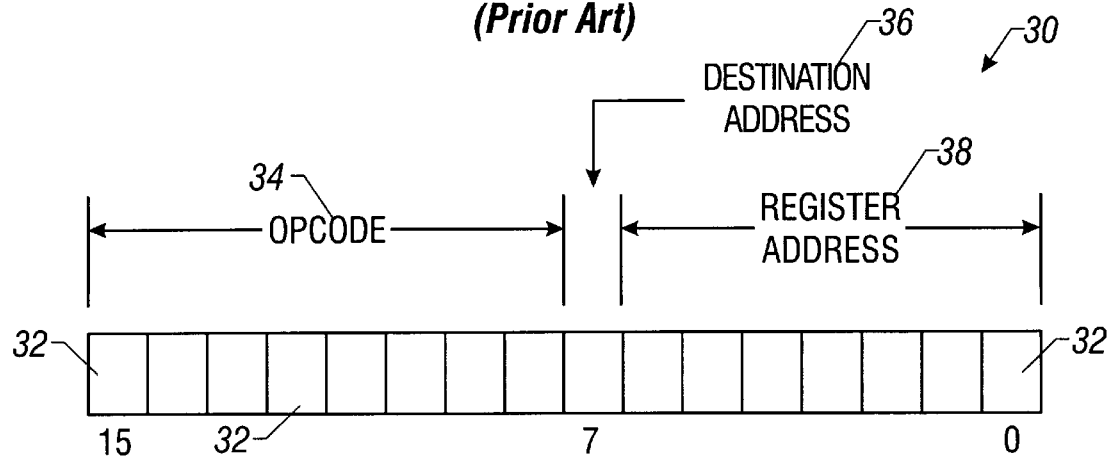
FIG. 3 is a simplified block diagram depicting the encoding of an instruction using the present invention.

Referring to FIG. 3, an instruction 30 to be executed by the processor architecture scheme of the present invention is shown. The instruction 30 is comprised of a plurality of bits 32. The bits 32 are generally divided into three main fields: (1) an opcode field 34 which indicates what type of operation will be carried out, (2) a destination bit 36 which indicates where the result of the processor operation will be stored (i.e., a "w" or working register, or a file register), and (3) register address field 38 which indicates the address of the register or data variable on which the instruction 30 is to operate. In the preferred embodiment of the present invention, the instruction is a 16 bit instruction.

What is unique about the instruction 30 is that excluding the destination bit 36, the length of the opcode field 34 and the register address field 38 are determined by the number of opcodes or the number of addressable registers the user wishes to implement. For example, if the user wishes to use seven bits in the opcode field 34, the user may implement a maximum of 128 opcodes. If the user requires only 64 possible opcodes, 6 bits may be used for the opcode field 34. Since one bit is used as a destination bit 36, 9 bits may be used as the register address field 48. This will allow the user to implement up to 512 addressable registers. Likewise, if only 128 addressable registers are required (i.e., may be implemented using a 7 bit register address field 38), if one bit 32 is used as a destination bit 36, 9 bits may be used for the opcode field 34. This will allow the user to have a maximum of 512 possible opcodes. Thus, as stated above, the instruction 30 of the present invention allows the user to maximize the number of available opcodes and the number of addressable registers for a given number of instruction bits.

Figure 4:
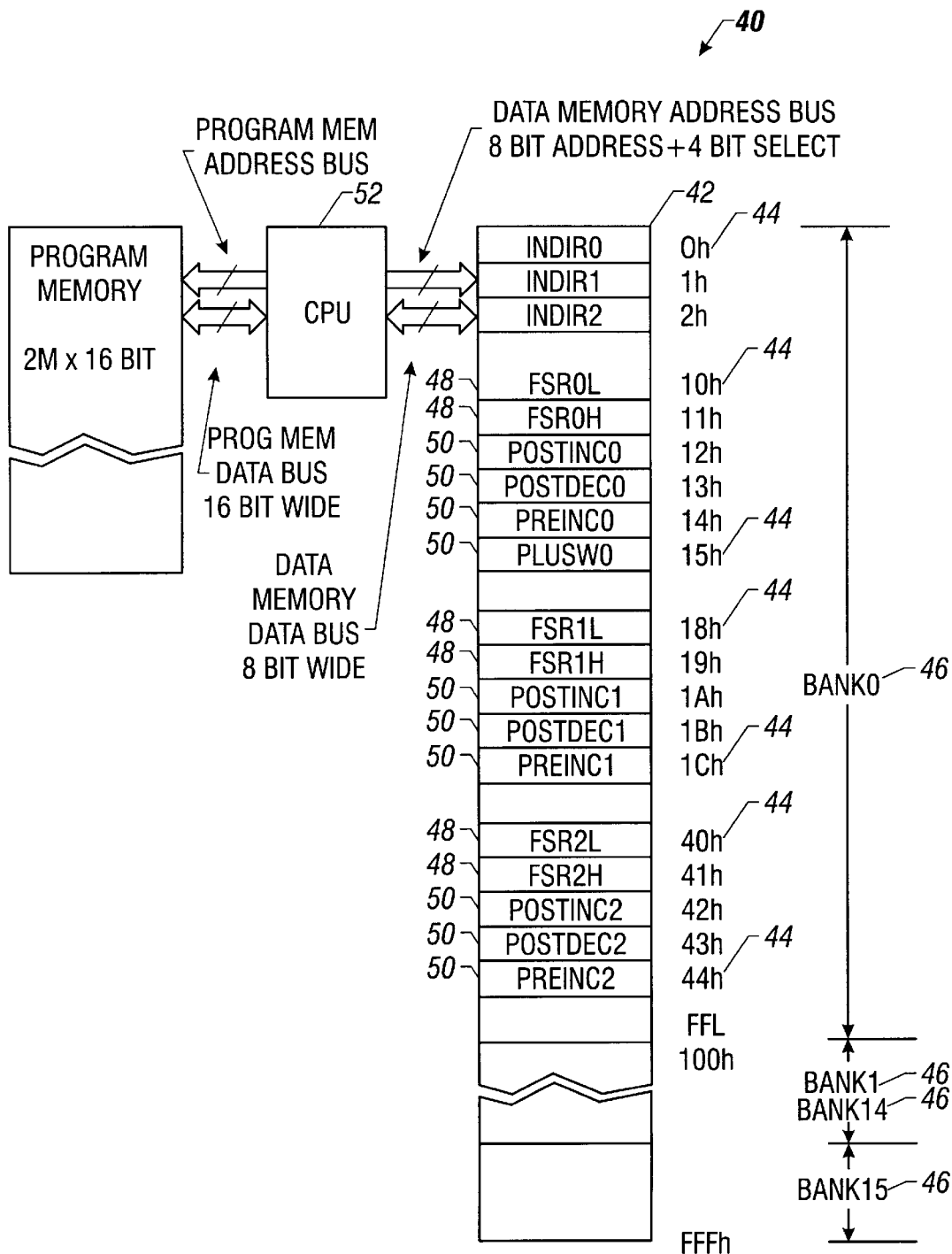
FIG. 4 is a simplified block diagram of the data memory map using the present invention.

Referring to FIG. 4, the processor architecture scheme 40 to be used with the instruction 30 is shown. The processor architecture scheme 40 has a data pointer register 48 which is implemented in a data memory 42. The data memory 42 is comprised of a plurality of address locations 44. In the embodiment shown in FIG. 4, the memory is a linearized 4 K memory which is divided into a plurality of pages 46 wherein each page 46 has 256 address locations 44. The data pointer register 48 has one or more virtual register address locations 50 reserved in the register address map. Each reserved virtual register address location 50 will initiate an indirect addressing mode when accessed.

Presently, there are five main types of addressing modes: simple indirect addressing, indirect addressing with auto post increment, indirect addressing with auto post decrement, indirect addressing with auto pre increment, and indirect addressing with offset. In a simple indirect addressing mode, the address of the operand is held in the data pointer register 48. The CPU 52 will first access the data pointer register 48 to get the address and using this address will access the operand. Indirect addressing with auto increment or auto decrement are forms of indirect addressing where the data pointer register 48 is incremented or decremented either before the data access (i.e., pre-increment or pre-decrement) or after the data access (i.e., post-increment or post-decrement). In an indirect addressing mode with offset, the address of the operand is calculated by adding an offset value to the contents of the data pointer register 48. The offset value may be embedded in the instruction or may come from yet another register. In the present embodiment, the offset value comes from the "w" register, which is the accumulator or "working" register. As before, the data pointer register 48 may be incremented or decremented before or after the operand access.

The data pointer register 48 will require a separate virtual register address location 50 in data memory 42 for each indirect addressing mode the data pointer register 48 wants to implement. In the preferred embodiment of the present invention, five virtual register address locations 50 are required to implement the five indirect addressing modes discussed above. However, additional or fewer indirect addressing modes may be implemented depending on the use of the data pointer register 48. Furthermore, additional data pointer registers 48 may be implemented in data memory 42. Each data pointer register 48 will have one or more virtual register address locations 50 reserved in the register address map. Each reserved virtual register address location 50 will initiate an indirect addressing mode for the associated data pointer register 48 when accessed. Each data pointer register 48 is a readable and writable address location. In the preferred embodiment of the present invention, each data pointer register 48 is a 12 bit. wide pointer capable of accessing a 4 K byte long memory area. Therefore, each data pointer register 48 is organized as two 8 bit wide registers (high byte and low byte) which are accessible as readable and writable registers. Thus, in the preferred embodiment of the present invention, 7 address locations are used to implement a 12 bit wide data pointer with five indirect addressing modes.

The present invention maximizes the number of register addresses that may be used as general purpose registers. In the instruction encoding technique using the preferred embodiment of the present invention, 8 bits are available to address data memory or registers. This allows up to 256 registers. Since 7 of the registers are used to implement the various indirect addressing schemes, 249 directly addressable registers are possible. Additional data pointer registers 48 may further be added without dramatically reducing the amount of directly addressable registers. The present invention greatly increases the amount of addressable registers as compared to the prior art example depicted in FIG. 1.

The present invention allows the flexibility of adding or deleting indirect registers. Since the indirect registers are not encoded in the instruction itself but keyed off special register addresses, it is possible to add new data pointer registers 48. Thus, two different products based on the same processor may implement different numbers of data pointer registers more easily than conventional methods.

The present invention also allows the flexibility of adding, deleting, or changing addressing modes. Just as data pointer registers 48 may be added or deleted easily, various addressing modes may be added or deleted easily. All that is required to add a new addressing mode is to designate a new data address location as a special address.

Using the present invention, it is possible to mix and match addressing modes and registers. Addressing modes in the prior art when encoded as part of an instruction format become fairly rigid. Using the present invention, it is possible to have any number of pointer registers with each one supporting any number and type of indirect addressing modes. The sum total of data pointer registers 48 and addressing modes are limited only by practical considerations of the amount of logic and circuitry required to implement them.

The present invention also allows the flexibility of being able to use any indirect addressing mode on an instruction by instruction basis. In the prior art, special control registers are used to control the variations of indirect addressing. The limitation of this is that once the control bits are set for a specific mode, all instructions can only use the selected mode until the control bits are altered. This effectively reduces the choice of addressing modes in a given segment of code to one since it is impractical to change the control bits frequently. In the present invention, each variation of the indirect addressing is given a unique register address. Thus, it is possible to use any indirect addressing mode in any instruction.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A computer system accommodating multiple address selection modes comprising:

a processor having an architecture scheme that accommodates encoding of multiple address selection modes;

system memory having a plurality of memory locations allocated as virtual registers, said virtual registers storing first addresses for accessing data;

a pointer register storing a second address pointing to any one of said virtual register memory locations;

said processor executing at least one instruction within an instruction set, said at least one instruction having a variable length opcode that instructs said pointer register to store said second address and access said data in one of said first addresses, thereby enabling selective addressing dynamically on an instruction-by-instruction basis.

2. A computer system accommodating multiple address selection modes in accordance with claim 1 wherein one of said virtual registers is dedicated for initiating simple indirect addressing when accessed.

3. A computer system accommodating multiple addressing modes in accordance with claim 1 wherein one of said virtual registers is dedicated for initiating indirect addressing with auto post increment when accessed.

4. A computer system accommodating multiple addressing modes in accordance with claim 1 wherein one of said virtual registers is dedicated for initiating indirect addressing with auto post decrement when accessed.

5. A computer system accommodating multiple addressing modes in accordance with claim 1 wherein one of said virtual registers is dedicated for initiating indirect addressing with auto pre increment when accessed.

6. A computer system accommodating multiple addressing modes in accordance with claim 1 wherein one of said virtual registers is dedicated for initiating indirect addressing with offset when accessed.

7. A computer system accommodating multiple addressing modes in accordance with claim 1 wherein said pointer register is a 12-bit wide pointer register.

8. A computer system accommodating multiple addressing modes in accordance with claim 1 further comprising:

a plurality of pointer registers in said memory; and dedicated address locations in said virtual registers equal to a total number of indirect addressing mode to be used with an associated pointer register of said plurality of pointer registers when accessed thereby enabling addressing modes to be selected dynamically on an instruction by instruction basis.

9. A computer system accommodating multiple addressing modes in accordance with claim 8 wherein each of said plurality of pointer registers are 12 bit wide pointer registers.

10. A computer system accommodating multiple addressing modes in accordance with claim 9, wherein each of said dedicated address locations in said virtual registers equal to a total number of indirect addressing modes associated with said plurality of pointer registers initiates one indirect addressing mode from a group consisting of: simple indirect addressing, indirect addressing with auto post increment, indirect addressing with auto post decrement, indirect addressing with auto pre increment, and indirect addressing with offset.

* * * * *